United States Patent
Sakai et al.

(10) Patent No.: US 6,741,063 B2
(45) Date of Patent: May 25, 2004

(54) INVERTER APPARATUS

(75) Inventors: Keijiro Sakai, Kanasagou (JP); Toshiaki Okuyama, Tokai (JP); Kinya Nakatsu, Hitachi (JP); Hiroyuki Tomita, Funabashi (JP); Junji Kato, Takaishi (JP); Teiichi Furukawa, Narashino (JP)

(73) Assignee: Hitachi, Ltd., Tokyo (JP)

(*) Notice: Subject to any disclaimer, the term of this patent is extended or adjusted under 35 U.S.C. 154(b) by 0 days.

(21) Appl. No.: 10/099,973

(22) Filed: Mar. 19, 2002

(65) Prior Publication Data

US 2003/0020432 A1 Jan. 30, 2003

(30) Foreign Application Priority Data

Jul. 24, 2001 (JP) ............................ 2001-223066

(51) Int. Cl.[7] ................................ H02P 7/63
(52) U.S. Cl. ................ 318/809; 318/798; 318/799; 318/801
(58) Field of Search .................. 318/798, 799, 318/801, 809

(56) References Cited

U.S. PATENT DOCUMENTS

| | | | |
|---|---|---|---|
| 5,481,168 A | * 1/1996 | Mutoh et al. | 318/432 |
| 5,821,727 A | * 10/1998 | Yura | 318/809 |
| 6,229,718 B1 | * 5/2001 | Nilssen | 363/37 |
| 6,377,018 B2 | * 4/2002 | Tajima et al. | 318/727 |
| 6,496,397 B2 | 12/2002 | Sakai et al. | 363/131 |

* cited by examiner

Primary Examiner—Rita Leykin
(74) Attorney, Agent, or Firm—Antonelli, Terry, Stout & Kraus, LLP

(57) ABSTRACT

Induction voltage command Em* is obtained from inverter's primary frequency command ω1* and torque boost voltage commander produces torque boost voltage command ΔVz* in accordance with ω1* while integrator produces reference phase command θd*. uvw/dq converter detects motor excitation current Id (equivalent of no-load current). Next, deviation of excitation current limitation level command Idmax* and detected Id is inputted to limiter processing unit to produce torque boost voltage compensation value ΔVc for varying ΔVz* so that Id is smaller than or equal to Idmax*. Inverted ΔVz* is set up as a lower limiter value of the limiter processing unit. Next, ΔVc and ΔVz* are added to produce final compensated torque boost voltage command ΔVt* and ΔVt* and Em* are added to produce q-axis voltage command Vq* of the inverter output voltage.

18 Claims, 8 Drawing Sheets

T-TYPE EQUIVALENT CIRCUIT OF INDUCTION MOTOR

APPROXIMATE EQUIVALENT CIRCUIT AT LOW FREQUENCY

VOLTAGE AND CURRENT VECTOR DIAGRAM IN NO LOAD

VOLTAGE AND CURRENT VECTOR DIAGRAM IN HEAVY LOAD

CHARACTERISTIC OF I1 IN CASE OF FIXED FREQUENCY COMMAND AND NO-LOAD OPERATION

CHARACTERISTIC V1 IN CASE OF FIXED FREQUENCY COMMAND AND NO-LOAD OPERATION

INVERTER APPARATUS

BACKGROUND OF THE INVENTION

The present invention relates to an inverter apparatus for controlling the speed of an induction motor variably.

As a method of controlling an inverter for driving the induction motor so that the induction motor is operated at variable speed, there is known a V/f fixed control method of controlling an output voltage (V1) of the inverter in proportion to a primary frequency (f1) of the inverter. This method has a problem that when a load is applied, an induced voltage (Em) of the induction motor is reduced because of a voltage drop across a primary resistance (r1) of the induction motor, so that a magnetic flux of the induction motor is made small and accordingly a maximum torque is reduced.

In order to increase a torque in a low and medium speed area, a general inverter includes torque boost function. When a large start torque is required, a boost voltage is set up to a high voltage in a low speed area and the boost voltage is added to a V/f fixed voltage command (induced voltage command Em*) to produce an output voltage command of the inverter. However, when the boost voltage is increased, over-excitation occurs in no load. When the over-excitation occurs, the magnetic flux of the induction motor is saturated and accordingly an excitation reactance is reduced to thereby increase an excitation current. Consequently, the temperature of the induction motor rises or the current of the inverter is increased excessively, so that there is the possibility that over-current protection function or over-load protection function is operated to be tripped.

A method of suppressing the over-excitation is described in, for example, JP-A-7-163188. In this method, a command for setting up a frequency to zero is issued before start of operation and a DC current is supplied to the induction motor. An output voltage of the inverter at the time that a current of U-phase becomes equal to an equivalent of a design value of the excitation current is set up as a torque boost voltage $\Delta Vz0$ at the time that the frequency is 0 Hz.

SUMMARY OF THE INVENTION

In the above method, since a torque boost voltage is set up so that the current in no load is equal to a rated excitation current (design value of excitation current), no over-excitation occurs. In this case, however, the voltage drop across the primary resistance is increased when the induction motor is loaded. As a result, there is a problem that the induced voltage (magnetic flux of motor) is reduced to thereby decrease an output torque. In this manner, when the torque boost voltage is made high, the torque is increased, while over-excitation occurs when the load is light. Conversely, when the torque boost voltage is made low, the over-excitation does not occur, while there is an antithetic problem that the torque is not increased.

It is an object of the present invention to provide an inverter apparatus suitable for prevention of over-excitation even when a torque boost voltage is set up to be high in order to obtain a large start torque in a general inverter.

In order to achieve the above object, the inverter apparatus according to an aspect of the present invention comprises detection means for detecting an excitation current of the induction motor, setting means for setting a limitation level of the excitation current, torque boost voltage command means for producing a torque boost voltage command in response to a frequency command of the inverter apparatus, and torque boost voltage compensation means for changing the torque boost voltage command so that the detected excitation current value is smaller than or equal to the excitation current limitation level.

The torque boost voltage compensation means includes limiter processing means and inverts the torque boost voltage command. The inverted torque boost voltage command is limiter-processed as a lower limiter value of the limiter processing means to produce a compensation value of the torque boost voltage command.

Other objects, features and advantages of the invention will become apparent from the following description of the embodiments of the invention taken in conjunction with the accompanying drawings.

DESCRIPTION OF THE EMBODIMENTS

Figure 1:
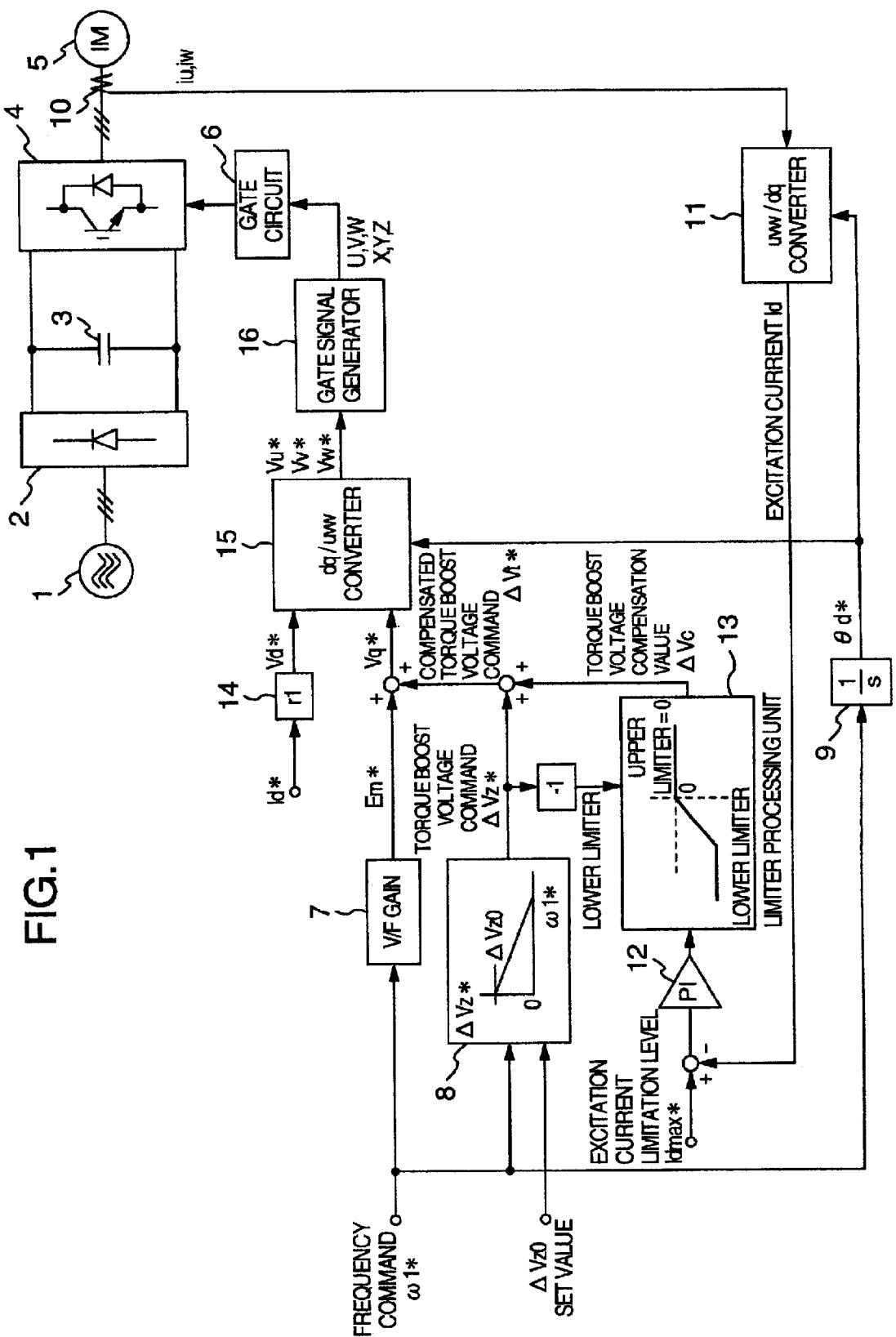
FIG. 1 is a block diagram schematically illustrating an inverter apparatus according to an embodiment of the present invention.

Embodiments of the present invention are now described with reference to the accompanying drawings. In the drawings, like elements are designated by like reference numerals.

FIG. 1 illustrates a control block of an inverter apparatus according to an embodiment of the present invention for controlling the speed of an induction motor variably.

An AC power from an AC power supply 1 is converted into a DC power by means of a rectification circuit 2 and a smoothing capacitor 3. The DC power is converted into an AC variable voltage having a variable frequency by means of an inverter unit 4 to drive an induction motor 550 that the induction motor is operated at variable speed. An output frequency and an output voltage of the inverter unit 4 are controlled by an inverter control circuit including, for example, a pate circuit 6, a V/F gain 7, a torque boost voltage commander 8, an integrator 9, a uw/dq converter 11, a PI controller 12, a limiter processing unit 13, a primary resistance 14, a dq/uw converter 15, and a gate support generator 16, as shown in FIG. 1.

In the inverter control circuit of the embodiment, a primary frequency command $\omega 1^*$ of the inverter unit 4 is multiplied by a V/f gain 7 to produce an induced voltage command Em*. Further, a torque boost voltage commander 8 produces a torque boost voltage command ΔVz* in accordance with the primary frequency command ω1*. In this connection, ΔVz0 is a torque boost voltage set value. Then, the primary frequency command ω1* is integrated by an integrator 9 to produce a reference phase command θd* which is a phase reference of the output voltage of the inverter unit 4. Further, a uvw/dq converter 11 makes calculation of the equation (1) on the basis of output currents iu and iw of a motor current detector 10 and the reference phase command θd* to detect an excitation current Id (equivalent of no-load current) of the inductor motor 5.

$$Iv = -(iu+iw)$$

$$Id = iu \cdot \cos \theta d^* + iv \cdot \cos(\theta d^* + 2\pi/3) + iw \cdot \cos(\theta d^* + 4\pi/3) \tag{1}$$

Next, a deviation of the an excitation current limitation level command Idmax* and the detected excitation current value Id is amplified by a PI (proportion and integration) controller 12 and an output of the PI controller 12 is supplied to a limiter processing unit 13. The limiter processing unit 13 processes the output of the PI controller 12 to produce a torque boost voltage compensation value ΔVc. Here, the torque boost voltage command ΔVz* is inverted by an inverter and the inverted torque boost voltage command ΔVz* is used as a lower limiter value of the limiter processing unit 13. The lower limiter value is varied in accordance with the primary frequency command ω1* of the inverter unit 4. Further, ΔVc and ΔVz* are added to produce a final compensated torque boost voltage command ΔVt*. Then, ΔVt* is added to the induced voltage command Em* to produce a q-axis voltage command Vq* of the inverter output voltage. On the other hand, a d-axis voltage command Vd* of the inverter output voltage is calculated by multiplying a rated excitation current command Id* by an equivalent of a primary resistance r1 of the motor in a primary resistance constant circuit 14. Then, a dq/uvw converter 15 is supplied with the rotating coordinate axis components Vd* and Vq* of the inverter output voltage command and produces three-phase voltage commands Vu*, Vv* and Vw* for the fixed coordinate axis. This calculation is expressed by the equation (2).

$$Vu^* = Vd^* \cdot \cos \theta d^* - Vq^* \cdot \sin \theta d^*$$

$$Vw^* = -Vu^*/2 - \sqrt{3}(Vd^* \cdot \sin \theta d^* + Vq^* \cdot \cos \theta d^*)/2$$

$$Vv^* = -(Vu^* + Vw^*) \tag{2}$$

Further, a gate signal generator 16 prepares PWM gate signals on the basis of the three-phase voltage commands Vu*, Vv* and Vw* to supply the PMW gate signals to a gate circuit 6.

Figure 2:
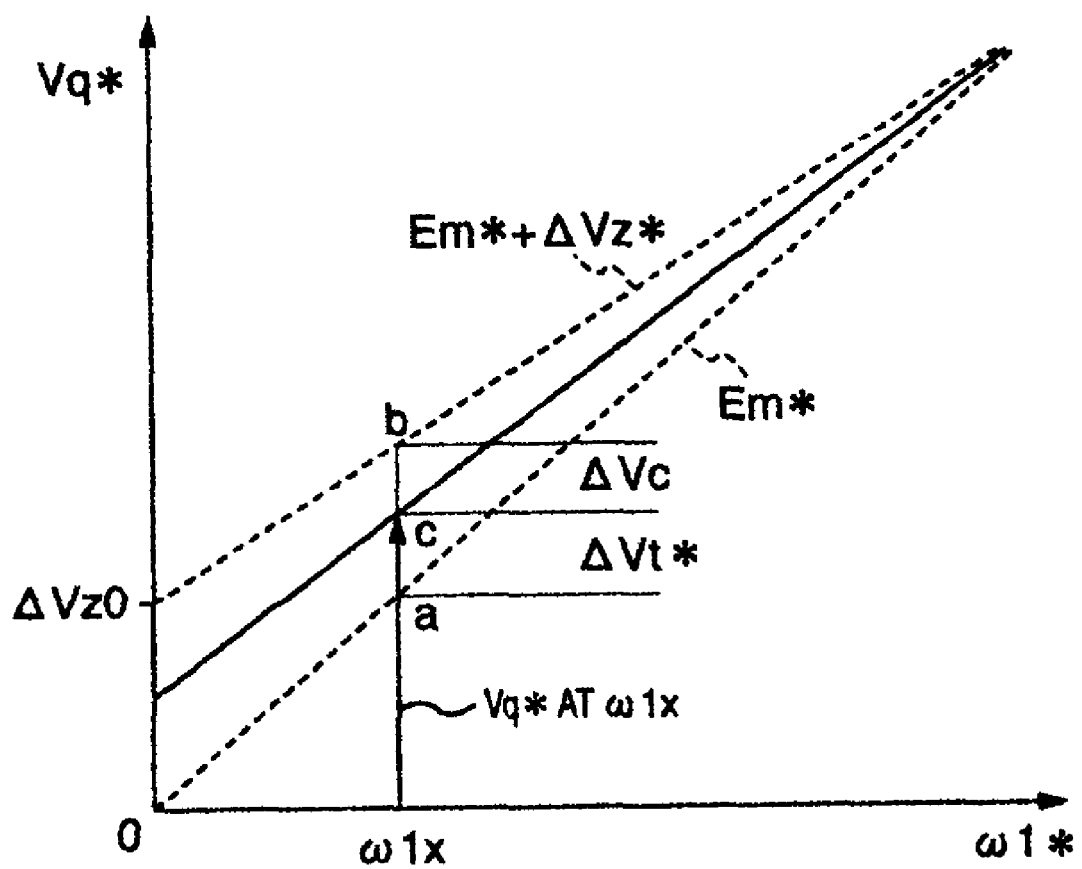
FIG. 2 is a graph showing a characteristic of a q-axis voltage command Vq* shown in FIG. 1.

FIG. 2 shows a range of the q-axis voltage command Vq* which is the rotating coordinate axis component of the inverter output voltage command.

For example, the magnitude of Vq* at the primary frequency command ω1*=ω1x is a value at point a of the induced voltage command Em* when the load is zero and since Vq* is small, the over-excitation can be prevented. On the other hand, when the load is heavy, the magnitude of Vq* at the primary frequency command is a value at point b of Em*+ΔVz* and since Vq* is large, large torque is obtained. Further, when the load is intermediate thereof, it is a value at point c of Em*+ΔVz*−ΔVc, for example. That is, since the value of Em*+ΔVz* at point b is compensated by ΔVc, it is the value at point c. In this manner, the torque boost voltage compensation value ΔVc is varied within the range from the point b to the point a in accordance with the load. That is, the torque boost voltage compensation value ΔVc is varied between upper and lower broken lines.

Incidentally, when there is no limitation control of the excitation current, the torque boost voltage compensation value ΔVc is 0 and accordingly the upper broken line becomes Vq*. In the case of Vq*, over-excitation occurs when the load is light at low speed area. In the embodiment, the limitation control of the excitation current is made so that when the load is light the torque boost voltage compensation value ΔVc is varied between the upper and lower broken lines to reduce Vq* so that over-excitation does not occur.

An operation of the embodiment is now described concretely.

First, when the load is lightened or lowered, the detected excitation current value Id is increased and when the limitation level Idmax* is exceeded, the PI controller 12 is supplied with a negative value. At this time, the torque boost voltage compensation value ΔVc becomes also negative. At this time, ΔVc is functioned to subtract the torque boost voltage command ΔVz* so that the final compensated torque boost voltage command ΔVt* is controlled to make the excitation current Id equal to the excitation current limitation level Idmax* (Id=Idmax). Then, when the load is heavy, the excitation current Id is smaller than the excitation current limitation level Idmax* (Id<Idmax*) and accordingly the compensation value ΔVc is increased from the negative value to be a value of −ΔVz to 0. Consequently, the final torque boost voltage command ΔVt* becomes 0 to ΔVz when the load is heavy.

As described above, when the load is light, the final compensated torque boost voltage command ΔVt* is reduced so that the excitation current Id is equal to the excitation current limitation level Idmax* (Id=Idmax*) and when the load is heavy, the final compensated torque boost voltage command ΔVt* is increased conversely. Since the compensation value ΔVc is varied within the range of the boost voltage command ΔVz* by means of the limiter processing unit 13, the final compensated torque boost voltage command ΔVt* is operated within the range of 0≦ΔVt* ≦ΔVz* to thereby prevent excessive compensation.

Operation of the embodiment is now described with reference to an approximate equivalent circuit and voltage and current vector diagrams of the induction motor 5.

Figure 3A:
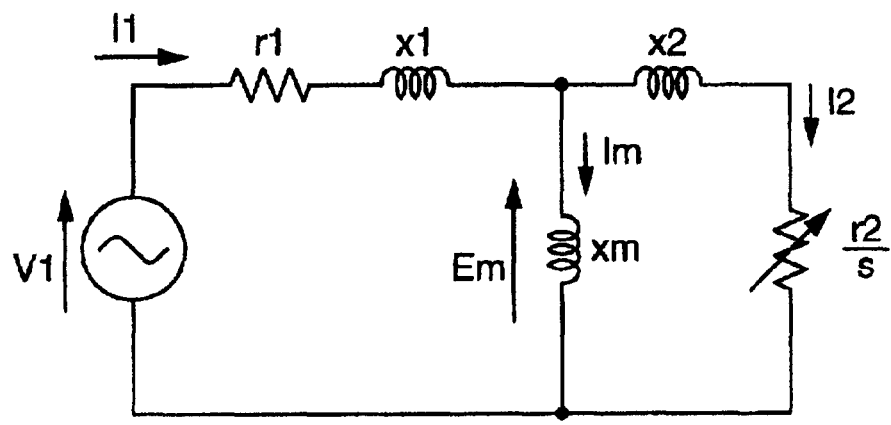
FIGS. 3A and 3B are circuit diagrams illustrating a T-type equivalent circuit and an equivalent circuit at a low frequency of an induction motor, respectively.

FIG. 3A illustrates a T-type equivalent circuit. r1 and r2 represent primary and secondary resistances, x2, x2 and xm represent primary and secondary leakage reactances and excitation reactance, respectively. Further, s represents slip. In the low-frequency area in which the torque boost control is required, x1≦r1 and x2≦r2/s. Accordingly, in the low-frequency area, the induction motor 5 can be approximated by the equivalent circuit of FIG. 3B.

Figure 4A:
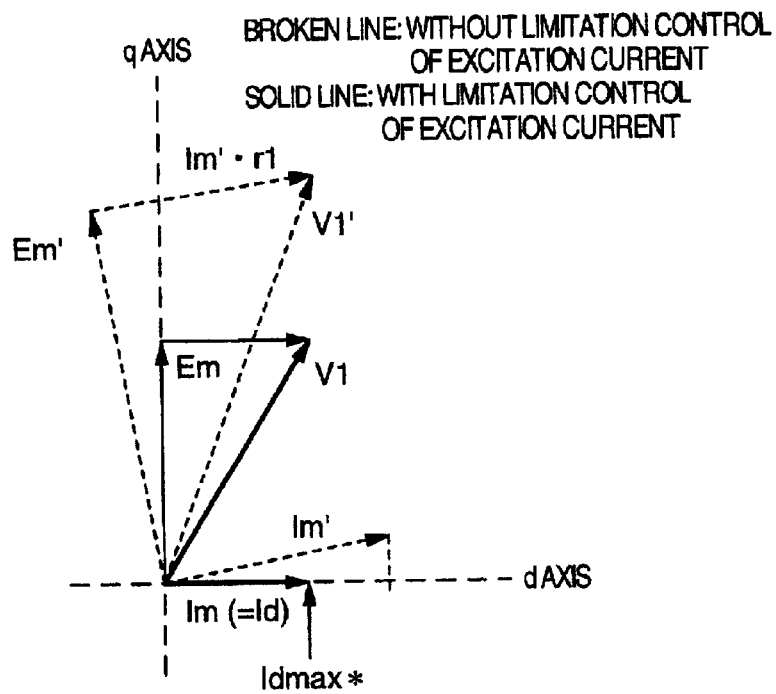
FIGS. 4A and 4B are vector diagrams illustrating output voltages and currents of the inverter in no load and heavy load in the present invention, respectively.
Figure 4B:
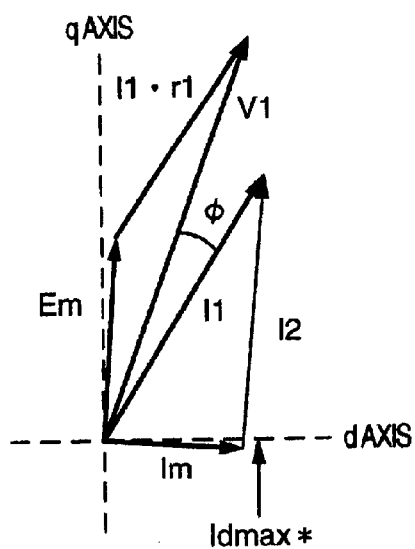

FIGS. 4A and 4B show voltage and current vector diagrams of the induction motor 5 in no load and heavy load using the approximate equivalent circuit.

In no load, since the slip s=0 and the secondary current I2=0, the equivalent circuit becomes a series circuit of r1 and xm and the primary current I1 is equal to the excitation current Im (I1=Im). Accordingly, the primary voltage vector V1 is given by the equation (3), where j represents the imaginary number.

$$V1 = Im(r1+jxm) \tag{3}$$

Further, when the d-axis voltage command Vd* is given by Id*·r1 and the q-axis voltage command Vq* is given by jIm·xm, the excitation current Im (no-load current) is approximately equal to Id shown by the equation (1) and the excitation current Im can be detected by Id. Id* represents the rated excitation current (no-load current) command.

The broken line of FIG. 4A shows the case where there is no limitation control of the excitation current and the primary voltage V1' is high. At this time, since the primary voltage V1' is high, the excitation current Id (Id≈Im') is larger than the limitation level Idmax*, so that over-excitation occurs. The solid line of FIG. 4A shows the case where the limitation control of the excitation current of the embodiment is effective. In this case, since the voltage V1 is reduced so that Id≦Idmax*, the no-load current Id (Id= Im) is approximately equal to Idmax*, so that over-excitation is prevented.

Figure 3B:
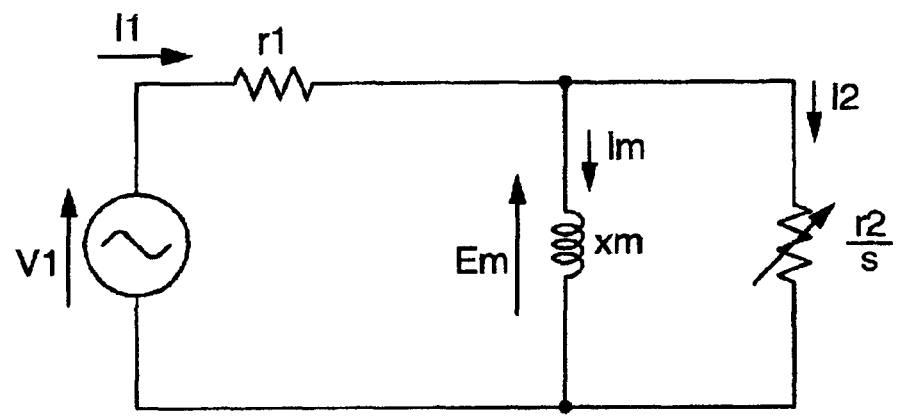

Next, operation in the heavy load is described. In this case, the equivalent circuit is as shown in FIG. 3B and the secondary current I2 is increased while the power-factor angle φ (angle between V1 vector and I1 vector) is decreased. At this time, the induced voltage Em is greatly reduced as compared with V1 due to a voltage drop across the primary resistance r1 and Im=Id<Idmax*. At this time, since Id<Idmax*, the torque boost voltage compensation value ΔVc becomes 0 (ΔVc=0). Consequently, since the torque boost voltage command ΔVz* is added as it is, the inverter output voltage is increased so that reduction of Em is compensated and the large start torque is obtained.

Figure 5A:
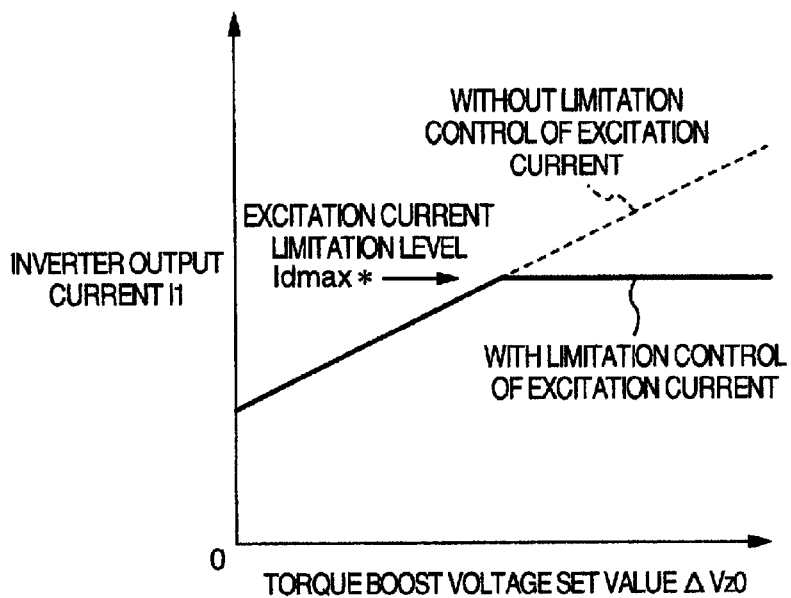
FIGS. 5A and 5B are graphs showing an output voltage characteristic and an output current characteristic of an inverter apparatus when a torque boost voltage is varied in no load state in the control of the present invention.
Figure 5B:
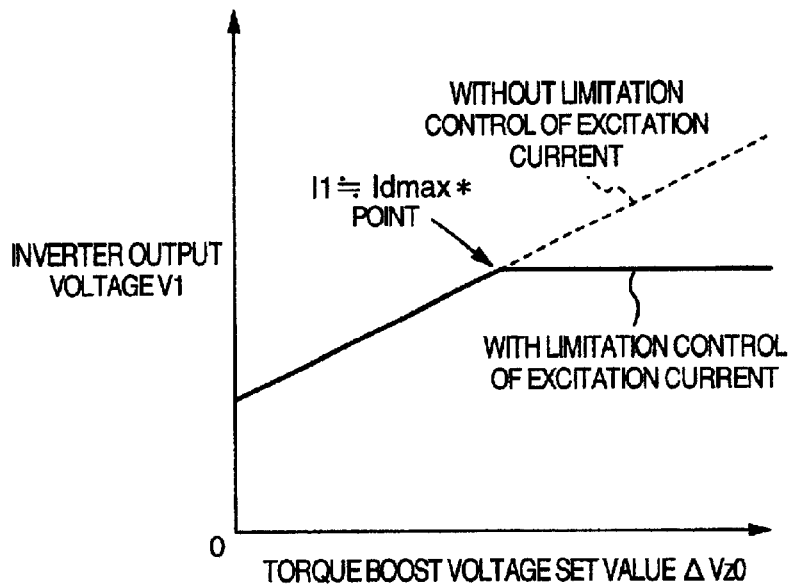

FIGS. 5A and 5B show characteristics of the inverter output current I1 and the inverter output voltage V1 in the case where the torque boost voltage set value ΔVz0 is increased gradually when the output frequency command of the inverter unit 4 is fixed to a low frequency and the inverter unit 4 is operated in no load in control of the embodiment.

When there is no limitation control of the excitation current, the output current I1 and the output voltage V1 are increased with increase of ΔVz0 as shown by broken line. On the other hand, when the embodiment is applied (when the limitation control of the excitation current is effective), the output current I1 is not increased after the time that the output current I1 approximately reaches Idmax* (I1≈Idmax*) as shown by solid line. Consequently, the excitation current (no-load current) is limited and accordingly over-excitation does not occur. Further, as shown by solid line of FIG. 5B, the inverter output voltage V1 is not also increased and accordingly over-excitation does not occur.

Figure 6:
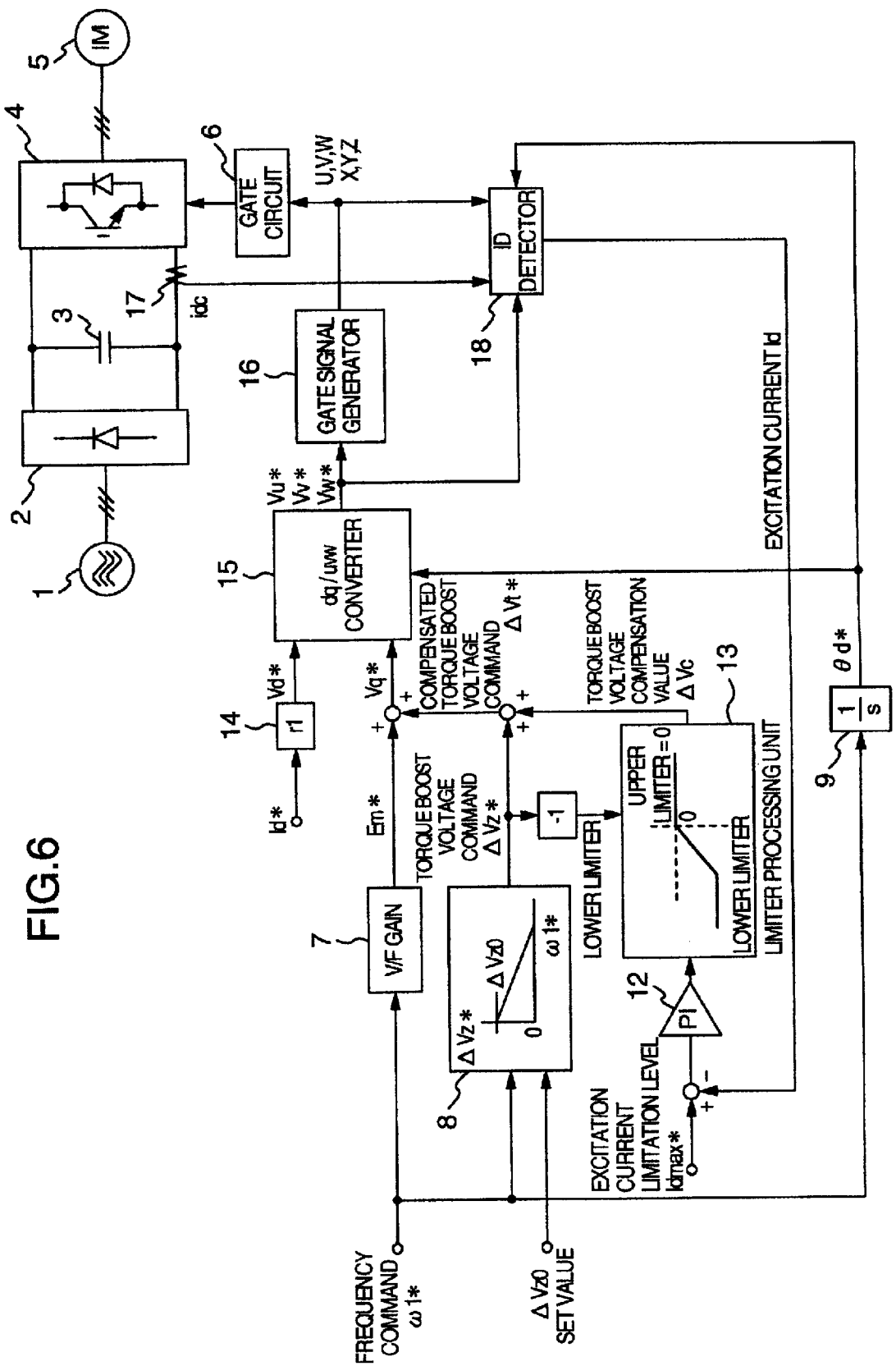
FIG. 6 is a block diagram schematically illustrating an inverter apparatus according to another embodiment of the present invention.

FIG. 6 schematically illustrates another embodiment of the present invention. This embodiment is different from the embodiment of FIG. 1 in that the excitation current Id is detected from the inverter input current idc. The excitation current Id is detected on the basis of an output signal idc of an inverter input current detector 17, the gate signal of the inverter and the reference phase command θd* in an excitation current detector 18.

Figure 7:
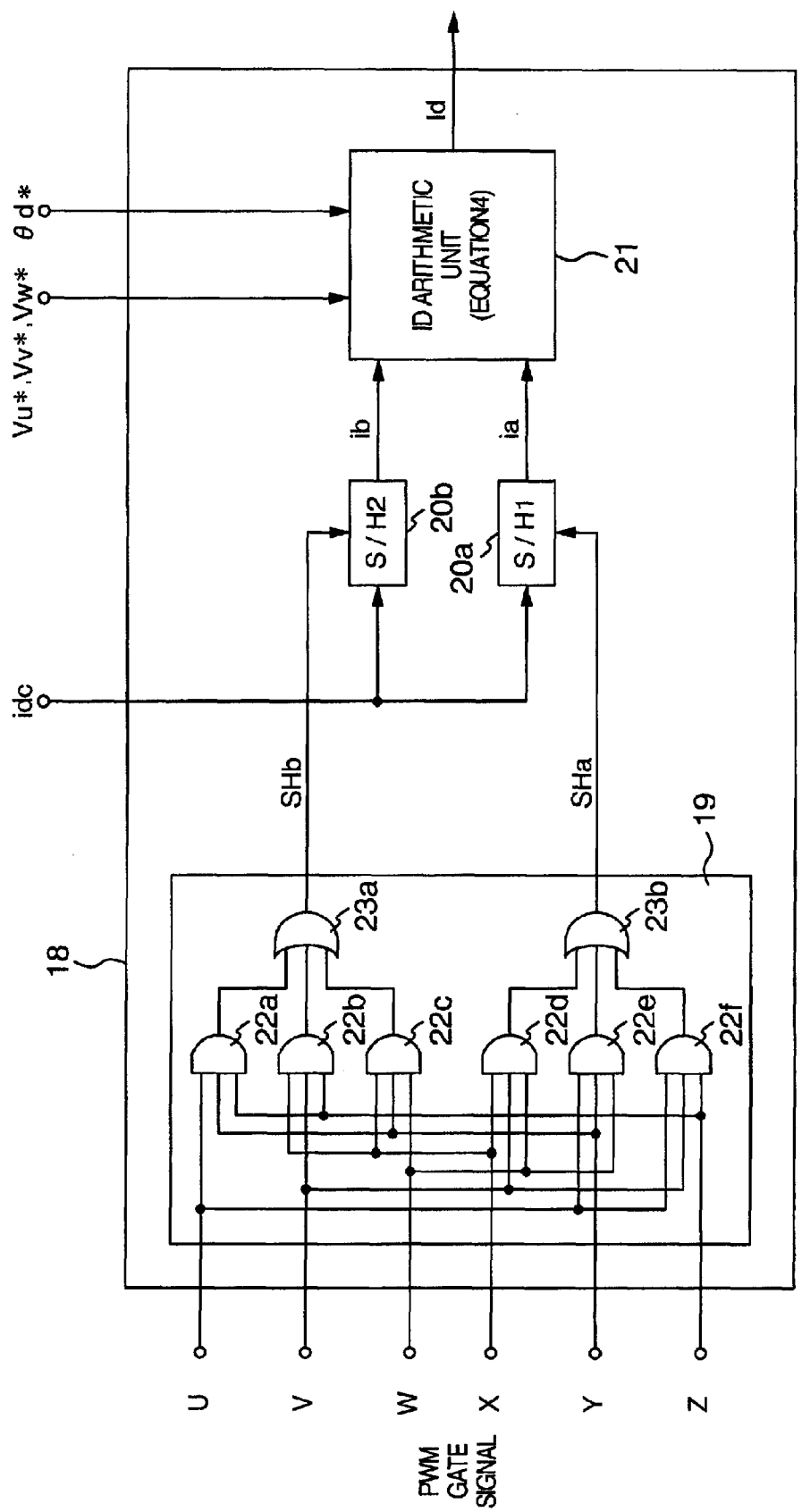
FIG. 7 is a block diagram illustrating an Id (excitation current) detector shown in FIG. 6 in detail.
Figure 8:
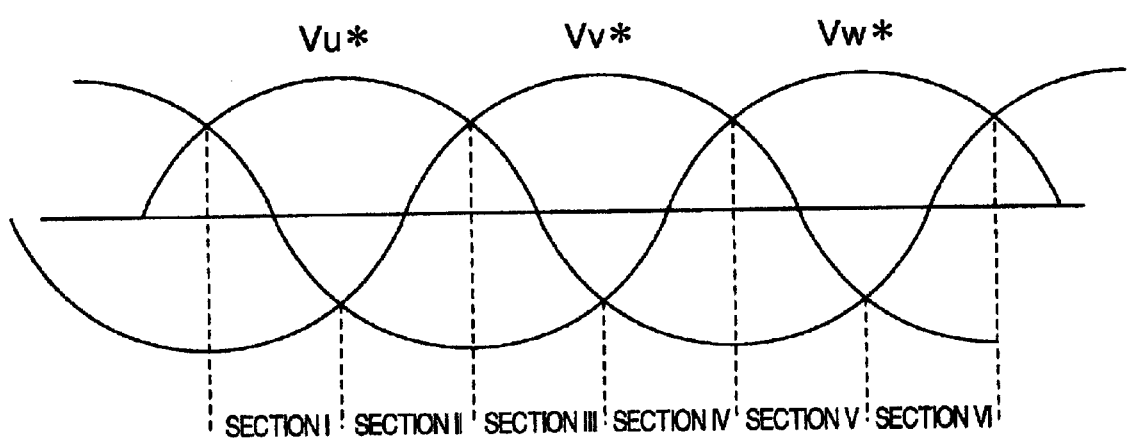
FIG. 8 is a graph showing a relation of three-phase voltage commands Vu*, Vw* and Vv* and sections I to VI.

FIG. 7 illustrates a detail configuration of the excitation current detector 18. The excitation current detector 18 is composed of a sample-and-hold signal preparation circuit 19, a sample-and-hold circuits 20a and 20b and an Id arithmetic unit 21. The sample-and-hold signal preparation circuit 19 produces a sample-and-hold signals SHa and SHb on the basis of PWM gate signals by means of logical AND circuits 22 and logical OR circuits 23 as shown in FIG. 7. In the circuit of FIG. 7, the inverter input current idc is sampled and held in the switching mode that only one phase gate signal of three-phase gate signals is turned on to be outputted as an ia signal. Further, in the switching mode that only two phases are turned on, idc is sampled and held to be outputted as an ib signal. Then, the Id arithmetic unit 21 performs calculation of the equation (4) to produce Id. FIG. 8 shows a relation of waveforms of three-phase voltage commands Vu*, Vw* and Vv* and sections I to VI.

In the section I, $$Vu^* \geqq Vw^* > Vv^*,$$

$$i\alpha=-ia, i\beta=(ia-2ib)/\sqrt{3},$$

$$Id=i\alpha \cdot \cos(\theta d^*-2\pi/3)+i\beta \cdot \sin(\theta d^*-2\pi/3)$$

In the section II, $$Vu^* \geqq Vv^* > Vw^*,$$

$$i\alpha=ib, i\beta=(2ia-ib)/\sqrt{3},$$

$$Id=i\alpha \cdot \cos \theta d^*+i\beta \cdot \sin \theta d^*$$

In the section III, $$Vv^* \geqq Vu^* > Vw^*,$$

$$i\alpha=-ia, i\beta=(ia-2ib)/\sqrt{3},$$

$$Id=i\alpha \cdot \cos(\theta d^*-4\pi/3)+i\beta \cdot \sin(\theta d^*-4\pi/3)$$

In the section IV, $$Vv^* \geqq Vw^* > Vu^*,$$

$$i\alpha=ib, i\beta=(2ib-ia)/\sqrt{3},$$

$$Id=i\alpha \cdot \cos(\theta d^*-2\pi/3)+i\beta \cdot \sin(\theta d^*-2\pi/3)$$

In the section V, $$Vw^* \geqq Vv^* > Vu^*,$$

$$i\alpha=-ia, i\beta=(ia-2ib)/\sqrt{3},$$

$$Id=i\alpha \cdot \cos \theta d^*+i\beta \cdot \sin \theta d^*$$

In the section VI, $$Vw^* \geqq Vu^* > Vv^*,$$

$$i\alpha=ib, i\beta=(2ib-ia)/\sqrt{3},$$

$$Id=i\alpha \cdot \cos(\theta d^*-4\pi/3)+i\beta \cdot \sin(\theta d^*-4\pi/3) \qquad (4)$$

Discrimination of the 60-degree sections I to VI is made on the basis of the magnitude of the three-phase voltage commands produced by the dq/uvw converter 15. Further, the discrimination of the 60-degree sections I to VI can be also made similarly by using the voltage command phase θd*. The system for detecting the excitation current Id from the DC current idc is described in JP-A-2001-314090 in detail.

In the embodiment of FIG. 6, only one inverter input current detector 17 may be used to detect the excitation current Id and the motor current detector (for two phases) as shown in the embodiment of FIG. 1 is not required, so that the inverter apparatus can be configured inexpensively.

As described above, according to the embodiment, since the torque boost voltage can be adjusted automatically so that the excitation current is smaller than or equal to the limitation level even when the torque boost voltage is set up to be large in the torque boost control of the inverter, over-excitation does not occur in light load. Furthermore, since the torque boost voltage can be set up to be high, large start torque can be obtained even in heavy load.

Further, since over-excitation does not occur even when the torque boost voltage is set up to be high, it is not necessary to adjust the torque boost voltage in accordance with the magnitude of load. Accordingly, adjustment is not required and handling is good.

It should be further understood by those skilled in the art that the foregoing description has been made on embodiments of the invention and that various changes and modifications may be made in the invention without departing from the spirit of the invention and the scope of the appended claims.

What is claimed is:

1. An inverter apparatus for converting a DC power from an input AC power to an output AC power having a variable frequency and a variable electric power to drive an induction motor at a variable speed, comprising:

a rectifying unit for converting an input AC power to a DC power, a filter capacitor for smoothing the DC power outputted from said rectifying unit, an inverter unit having an input connected across said filter capacitor, a motor current detector for detecting a motor current outputted from said inverter unit and a gate circuit for driving said inverter unit;

an excitation detection unit for detecting an excitation current of said induction motor from an output of said motor current detector and a reference phase command;

a setting unit for setting a limitation level of said excitation current;

a torque boost voltage command unit for producing a torque boost voltage command according to an inverter frequency command; and a torque boost voltage compensation unit for changing said torque boost voltage command so that the detected excitation current value is smaller than or equal to said limitation level.

2. An inverter apparatus according to claim 1, wherein said torque boost voltage compensation unit includes a limiter processing unit, and inverts said torque boost voltage command, which is limiter-processed as a lower limiter value of said limiter processing unit to produce a compensation value of said torque boost voltage command.

3. An inverter apparatus according to claim 1, wherein a no-load motor current is limited substantially to an excitation current limitation level when said torque boost voltage command is increased gradually in the state that said induction motor is being operated in no load.

4. An inverter apparatus according to claim 1, wherein an inverter output voltage is controlled to be substantially constant after the time when a no-load motor current reaches substantially an excitation current limitation level when said torque boost voltage command is increased gradually in the state that said induction motor is being operated in no load.

5. An inverter apparatus according to claim 2, wherein a no-load motor current is limited substantially to an excitation current limitation level when said torque boost voltage command is increased gradually in the state that said induction motor is being operated in no load.

6. An inverter apparatus according to claim 2, wherein an inverter output voltage is controlled to be substantially constant after the time when a no-load motor current reaches substantially an excitation current limitation level when said torque boost voltage command is increased gradually in the state that said induction motor is being operated in no load.

7. An inverter apparatus for converting a DC power from an input AC power to an output AC power having a variable frequency and a variable electric power to drive an induction motor at a variable speed, comprising:

rectifying means for converting an input AC power to a DC power, filter means for smoothing the DC power outputted from said rectifying means, inverter means having an input connected across said filter means, motor current detection means for detecting a motor current outputted from said inverter means, and gate drive means for driving said inverter means;

excitation current detection means for detecting an excitation current of said induction motor from an output of said motor detection means and a reference phase command;

setting means for setting a limitation level of said excitation current;

torque boost voltage command means for producing a torque boost voltage command according to an inverter frequency command; and torque boost voltage compensation means for changing said torque boost voltage command so that the detected excitation current value is smaller than or equal to said limitation level.

8. An inverter apparatus according to claim 7, wherein said torque boost voltage compensation means includes limiter processing means, and inverts said torque boost voltage command, which is limiter-processed as a lower limiter value of said limiter processing means to produce a compensation value of said torque boost voltage command.

9. An inverter apparatus according to claim 7, wherein a no-load motor current is limited substantially to an excitation current limitation level when said torque boost voltage command is increased gradually in the state that said induction motor is being operated in no load.

10. An inverter apparatus according to claim 7, wherein an inverter output voltage is controlled to be substantially constant after the time when a no-load motor current reaches substantially an excitation current limitation level when said torque boost voltage command is increased gradually in the state that said induction motor is being operated in no load.

11. An inverter apparatus according to claim 8, wherein a no-load motor current is limited substantially to an excitation current limitation level when said torque boost voltage command is increased gradually in the state that said induction motor is being operated in no load.

12. An inverter apparatus according to claim 8, wherein an inverter output voltage is controlled to be substantially constant after the time when a no-load motor current reaches substantially an excitation current limitation level when said torque boost voltage command is increased gradually in the state that said induction motor is being operated in no load.

13. An inverter apparatus, comprising:

a conversion unit for converting an input AC power to a DC power;

an inverter unit for converting the DC power into an output AC power having a variable frequency and a variable electric power to drive an inductor motor at a variable speed;

an excitation current detection unit for detecting an excitation current of said induction motor; and an inverter control circuit arranged to control the variable frequency and the variable electric power of the AC power outputted from the inverter unit, said inverter control circuit comprising:

a setting unit for setting a limitation level of the excitation current;

a torque boost voltage command unit for producing a torque boost voltage command according to an inverter frequency command; and a torque boost voltage compensation unit for compensating the torque boost voltage command, when the excitation current is equal to or larger than a predetermined value, and for generating a compensated torque boost voltage command controlled so that the excitation current value detected is smaller than or equal to said limitation level of the excitation current.

14. An inverter apparatus according to claim 13, wherein the torque boost voltage compensation unit includes a limiter processing unit arranged to process an invert of the torque boost voltage command as a lower limiter value so as to generate a compensated torque boost voltage command.

15. An inverter apparatus according to claim 13, wherein a no-load motor current is limited substantially to an excitation current limitation level when the torque boost voltage command is increased gradually in the state that the induction motor is being operated in no load.

16. An inverter apparatus according to claim 13, wherein an inverter output voltage is controlled to be substantially constant after the time when a no-load motor current reaches substantially an excitation current limitation level when the torque boost voltage command is increased gradually in the state that the induction motor is being operated in no load.

17. An inverter apparatus according to claim 13, wherein the inverter control circuit further comprises:

an integrator arrange to integrate the inverter frequency command to produce a reference phase command;

a three-phase converter arranged to generate three-phase voltage commands for a fixed coordinate axis according to coordinate axis components of the compensated torque boost voltage command, an Induced voltage command and the reference phase command;

a gate signal generator arranged to prepare gate signals according to the three-phase voltage commands; and a gate circuit arranged to drive the inverter unit according to the gate signals.

18. An inverter apparatus according to claim 17, wherein the excitation current detection unit comprises:

a signal preparation circuit including a series of logical AND gates and logical OR gates arranged to prepare the gate signals;

sample-and-hold circuits arranged to sample and hold the gate signals prepared from the signal preparation circuit; and an arithmetic circuit arranged to perform a predetermined calculation of sampled signals on the basis of the three-phase voltage commands.

* * * * *